(12) United States Patent
Bala

(10) Patent No.: US 6,233,678 B1
(45) Date of Patent: May 15, 2001

(54) METHOD AND APPARATUS FOR PROFILING OF NON-INSTRUMENTED PROGRAMS AND DYNAMIC PROCESSING OF PROFILE DATA

(75) Inventor: Vasanth Bala, Sudbury, MA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/186,948

(22) Filed: Nov. 5, 1998

(51) Int. Cl.[7] .................................................. G06F 9/32
(52) U.S. Cl. ........................................ 712/240; 712/239
(58) Field of Search ................................. 712/239, 240, 712/238, 234, 236, 233, 244; 710/1, 52; 709/100; 711/118

(56) References Cited

U.S. PATENT DOCUMENTS 5,228,131 * 7/1993 Ueda et al. .
5,584,001 * 12/1996 Hoyt et al. .
5,935,241 * 8/1999 Shiell et al. .
5,978,909 * 11/1999 Lempel .
6,055,629 * 4/2000 Kulkarni et al. .

OTHER PUBLICATIONS

Thomas Ball, James R. Larus "Efficient Path Profiling", Dec. 1996, Micro–29, pp. 1–12.

Thomas M. Conte, Burzin A. Patel, J. Stan Cox "Using Branch Handling Hardware To Support Profile–Driven Optimization", Nov. 1994, Micro–27, pp. 12–21.

* cited by examiner

Primary Examiner—Gopal C. Ray

(57) ABSTRACT

An apparatus and method are shown for collecting a branch history value of a program executing in a processor. A current start address register latches a program count value in response to a trace termination condition, such as an indirect branch instruction. A current branch history register is cleared in response to the trace termination condition and shifts in a branch outcome value of the processor in response to a conditional direct branch instruction. A last trace start address latches the content of the current trace start address and a last branch history register latches the content of the current branch history register when a trace termination condition occurs.

33 Claims, 9 Drawing Sheets

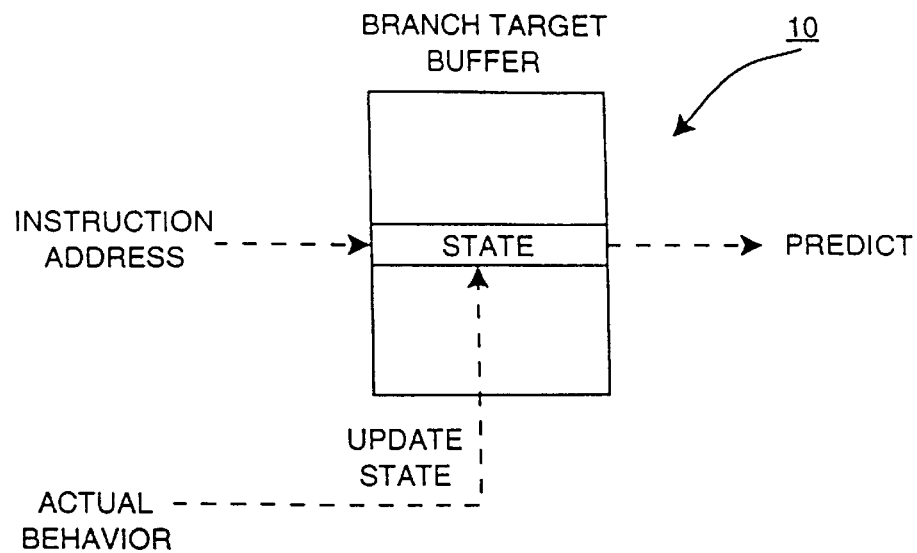
FIG. 2A *(Prior Art)*
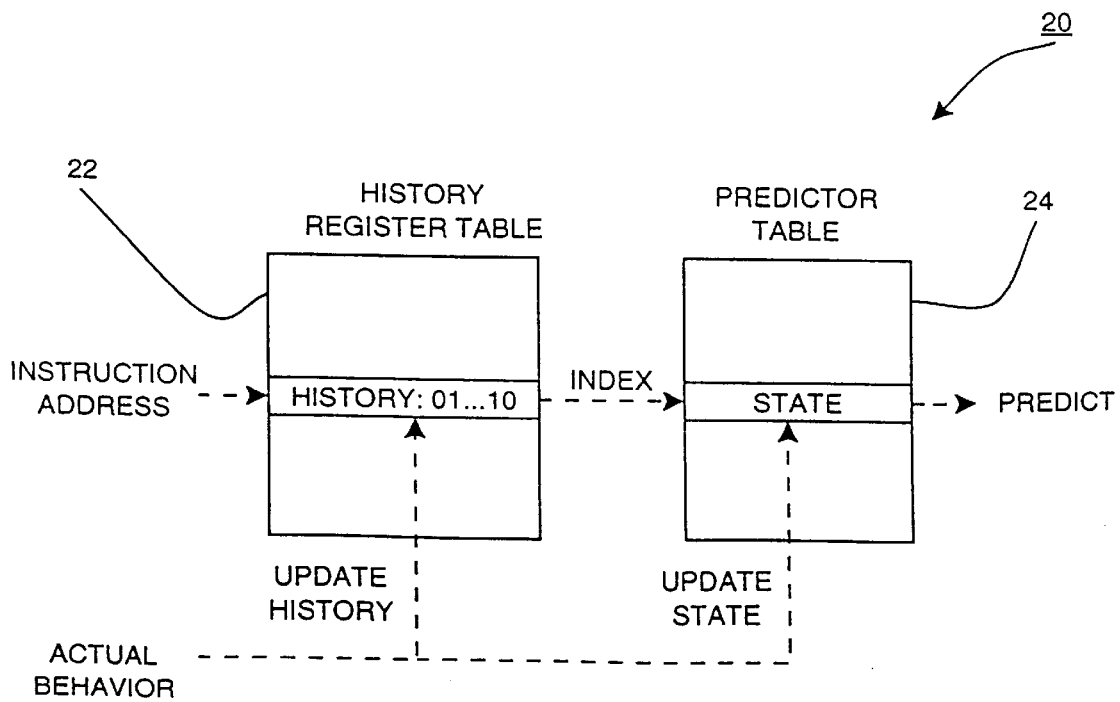
FIG. 2B *(Prior Art)*

METHOD AND APPARATUS FOR PROFILING OF NON-INSTRUMENTED PROGRAMS AND DYNAMIC PROCESSING OF PROFILE DATA

BACKGROUND OF THE INVENTION

1. Field of the Invention

This invention relates generally to the runtime profiles of software programs executing on computers.

2. Description of the Related Art

Runtime profiling is a mechanism for understanding a program's runtime behavior. A runtime profile is a collection of information indicating the control flow path of a program, i.e. which instructions executed and where branches in the execution took place. Profile-based optimizations can then be used for instruction scheduling, loop scheduling, data preloading, function in-lining, and instruction cache performance enhancement.

The runtime profile of a program is used by optimizing compilers and dynamic translators to focus their analysis efforts on parts of the program where greater performance benefit is likely. Advanced compilers perform optimizations across block boundaries to increase instruction-level parallelism, enhance resource usage and improve cache performance. Profile data is also useful for software developers in tuning the performance of their programs.

Program profiling typically counts the occurrences of an event during a program's execution. The measured event is typically a local portion of a program, such as a routine, line of code or branch. More fine-grained profiling is also possible based upon basic blocks and control-flow edges. Profile information for a program can consist of simple execution counts or more elaborate metrics gathered from counters within the computer executing the program.

One conventional approach to profiling is to instrument the program code by adding profiling probes to the code. Profiling probes are additional instructions which are used to log the execution of a basic block of code containing the probe. Typically, the program is compiled with the profiling probes placed within each basic block of code. The instrumented code is then executed using several different suites of test inputs to obtain several sets of profile data. The program is subsequently recompiled using the resulting profile data to give profile-based compilation of the original program.

Instrumentation based methods for gathering profile data tend to be complex and time consuming. Instrumentation of the code can result in a code size explosion due to the added instructions. The additional probe instructions also slow execution of the code and a profiled, or instrumented, version of a program can run as much as thirty times slower than the original version. Execution slow down is more than an inconvenience. Experience has shown that slow down is a major reason for profile based optimizations not being widely used in the user community.

Selection of representative test input suites for instrumented programs is important to the accuracy of the profile data. If the inputs are not selected carefully, the profile will not reflect actual usage. Programs that are highly data-dependent, such as a sort routine or a database application, have branches that are highly sensitive to user inputs. Validating the profile is difficult without a large scale study of user habits. In the absence of a user study, profiling is typically done using a large set of inputs which increases the time required to produce accurate profiling data.

However, in order to reduce the time required to obtain instrumented profiling, small test input data suites must be used to profile the program. Smaller test input suites, however, reduce the accuracy of the resultant profile data. Therefore, there is a trade-off between the accuracy of profiling and the time required to perform profiling.

There remain, however, some programs for which it is difficult or impossible to come up with representative test input data. Real time applications, such as operating system (OS) kernels and embedded systems, are excluded from the benefits of profile driven optimizations because of their execution nature. Long running applications, such as database systems, are often excluded from profiling as well.

Furthermore, analyzing and using the profile data requires additional processing steps. A program must be compiled with profiling enabled, executed using the test input suites, and then recompiled based upon the profile data. For small programs, this does not involve a large amount of overhead or difficulty. However, for large systems, such as commercial database applications, this requires significant alteration of build scripts. A large number of man-hours are invested in these scripts. In addition, large systems will require a significant amount of processing time for analysis and recompilation. As a result, software vendors are hesitant to adopt profile driven optimizations.

An alternative to instrumenting the program code is to use statistical program count (PC) sampling. The actual program runs under control of a profiler program which acts as a wrapper around the code which is being profiled. The profiler program makes an operating system call to set up a timer interrupt to be delivered to the profiler program at a predetermined frequency of X times per second. It also registers a "handler procedure" for this interrupt within the operating system. The actual program execution is then started and driven by a test input suite.

When a timer interrupt occurs, the handler procedure is invoked and the running program is suspended. At this point, the state of the machine (in other words, the program count of the process) is passed to the profiler program for recordation. The handler procedure also often records the values of many of the registers of the processor at the time of the interrupt.

The overhead of statistical PC sampling is determined by the sampling frequency X that is selected. The overhead and speed are determined by the sampling frequency. Overhead will decrease and speed will increase when the sampling frequency is decreased. However, the accuracy of the profile data is also determined by sampling frequency and increases when the sampling frequency is increased. Therefore, there is a trade-off between overhead and accuracy when selecting the sampling frequency.

Further, the statistical PC sampling approach described above typically results in too fine a level of granularity. It also doesn't really track the control flow well and requires a high level of analysis in order to use it in the process of optimizing the code. In order to perform optimization of the program code, the profile information which indicates which parts of the code are hot (in other words, those parts of the code which execute frequently) need to be mapped back to the program's control flow. This is difficult to do when the profile data is associated with a bunch of program count values that are taken at arbitrary intervals. Also, due to the high level of analysis required, the analysis of the profile data is usually performed after the runtime of the program. This has the disadvantage that some of the dynamic addressing information may be lost, such as the runtime control flow of the program within a dynamically linked library. In addition, the requirement of post-runtime analysis prevents statistical PC sampling from being used for on-the-fly optimization.

Alternatively, static methods exist which are based upon compiler assumptions and do not involve the use of profile data obtained through instrumentation of the code or execution interrupts and which do not require the code to be recompiled. However, these static estimates are typically not as accurate as profiling. For example, when static estimates are used to predict branch behavior, the inaccuracy of the predictions are approximately twice that for predictions based upon profiled information. Furthermore, control flow within dynamically bound procedures is difficult to estimate statically.

Another approach is to use existing branch handling hardware to speed up profiling. The use of hardware to reduce overhead overcomes the need to trade-off accuracy for lower profiling overhead, as is the case with statistical PC sampling. The use of hardware can also reduce the level of instrumentation required in the code which avoids the code explosion and execution slowdown which occurs in instrumented programs.

Hardware assisted methods for statistically profiling a program typically involve keeping a branch history of the behavior of that program. A branch history is obtained using a buffer which stores the history of branch behavior in a block of code by storing a one in the branch history buffer for each branch taken within the basic block and a zero for each branch that is not taken.

An example of a hardware assisted profiling technique that uses existing branch handling hardware in commercial processors is proposed in Conte, Patel and Cox, "Using Branch Handling Hardware to Support Profile-Driven Optimization", MICRO 27, November 1994. The scheme described obtains profiles having high accuracy with only a 0.4%–4.6% slowdown in execution for use in branch prediction hardware.

To predict a branch in existing branch prediction hardware, the branch instruction's address is combined with the current value of the branch history. This can be a global branch history of the last k branch outcomes or a table that has a per-branch history, i.e. the last k outcomes of the same branch. The resulting value is used to index into a predictor table in order to read off the prediction. After the branch actually executes, the outcome of the branch (0/1) is shifted into the branch history buffer. The branch history buffer may be a global buffer that records the outcome of every branch that executes, or it may be a per-branch buffer that records only the past history of the same branch. Bits are simply shifted off the end of the branch history register and no check is made to see if it is full. Only direct branches are handled by modern branch prediction hardware, indirect branches cannot be predicted.

Conte et al use the branch prediction hardware typically used in modern microprocessors for branch prediction to obtain profile information about a running program with very low overhead. Their scheme works as follows: (1) The program to be profiled is enhanced with a table of control flow graph (CFG) arcs. A CFG is illustrated in FIG. 1, where the arcs are represented as arrows between code blocks A–F. The CFG structure represents the static control flow of the program, as determined by a compiler compiling the program. (2) During runtime, the operating system kernel periodically reads the branch history information recorded in the branch prediction buffers, and uses it to increment counters associated with the CFG arcs. This process can be viewed as converting the CFG into a Weighted Control Flow Graph (WCFG), because the arcs of the CFG are distinguished (or "weighted") by the values of the counters that are associated with them. In order to keep the overhead low, the CFG arc counts can be updated in memory, and the entire WCFG written out to disk after the program completes execution.

Modern branch prediction hardware typically consists of a buffer, indexed by branch instruction addresses, that contains information about the recent history of branch behavior. There are many ways of organizing the history information, for example each buffer entry may contain a record of the same branch's previous outcomes (a per-branch history), or each buffer entry could contain the outcomes of the sequence of branches that immediately preceded this branch the last time this branch was executed (a global branch history). In either case, this branch history information is extracted from the buffer entry, and used to predict the outcome of the current instance of a branch. FIG. 2A illustrates one way of organizing a branch target buffer which is indexed by the branch instruction address. Again, there are several ways of using the history information to obtain a prediction, for example the history value can be combined with the branch instruction address and the resulting value used to index into a predictor table to obtain a predicted outcome for the current branch instruction. FIG. 2B illustrates an example of a history register table 22 which is indexed with the branch instruction address to obtain the branch history for indexing into a predictor table 24.

Once the branch instruction is actually executed, the branch history information maintained by the branch prediction hardware is updated to account for the actual outcome (0/1) of this branch. This is typically done by extracting the branch history from the buffer entry indexed by this branch into a shift register, shifting in the outcome of this branch at the end, and storing the new branch history value back to the buffer entry. FIG. 3 illustrates a history register table 22 with three sample buffer entries.

In Conte's scheme, when the operating system samples the information recorded in the branch prediction hardware's buffer, it estimates the number of times a particular branch executed, and then associates this count with the CFG arc that represents the branch instruction. There are two possible CFG arcs corresponding to each branch instruction, one for the taken direction (denoted by a 1 in the branch history) and the other for the not-taken direction (denoted by 0 in the branch history). Conte et al suggest several heuristics to estimate a CFG arc count from the branch history information, for example, the number of 1's in the branch history divided by the length of the history gives an estimate for the number of times the branch was taken.

Over counting of an arc's weight can occur if the branch history information is sampled more frequently than it changes. Zeroing out the branch history each time it is sampled by the operating system does not solve the problem, because "0" entries in the history also signify not-taken branches. The solution suggested by Conte et al is to use a leading "1" as a marker bit, shown in FIG. 3, to denote the boundary between invalid and valid branch histories. After the branch history is sampled by the operating system, it zeros the history and sets the least significant bit (LSB) of the branch history to 1. Thereafter, when the branch history shifting logic updates the branch history, this bit shifts to the left. Some additional logic is also required to detect when the marker bit reaches the most significant bit (MSB)

position of the shift register. Once this occurs, Conte et al suggest an extra "full-bit" associated with the branch history be set to 1, indicating that the entire contents of the history are valid. FIG. 3 illustrates a buffer entry having its "full-bit" set to 1. However, the contents of the history itself (excluding the full-bit) will continue to be shifted to the left, so that leftmost bit will get shifted off the end.

The disadvantage of Conte et al's scheme is that the branch history information maintained by the branch prediction hardware is shared by all programs running on the processor, and is not part of the state of the profiled program. Thus, not only can different branches of the same program map to the same branch history entry, but branches in different programs can also map to the same branch history entry. Therefore, a bit in a branch history may correspond to the outcome of an arbitrary branch in any of the currently executing programs. Because Conte et al are only interested in estimating arc counts, this only decreases the accuracy of the count, but does not affect the integrity of their scheme. However, this branch history information cannot be used to reconstruct the actual sequence of branch instructions executed by the program at runtime. This is only possible if the branch history is kept as part of the executing program's state, and is saved and restored by the operating system during a context switch. Furthermore, the only way to determine frequent execution paths in the program with Conte et al's technique, is to do an analysis of the WCFG to locate the arcs with the highest weights and try to string them together to form traces. The high level of analysis required to process the WCFG makes it too expensive to apply at runtime while the program is executing.

Another disadvantage of Conte et al's profiling technique is that the program has to be essentially "instrumented" by enhancing it with the CFG structure. In addition, indirect branches (i.e., branches whose targets may be different for different executions of the branch) cannot be handled, requiring the compiler to convert indirect branches into a sequence of conditional direct branches in order to profile them. Both these problems make this scheme unusable on legacy program binaries (i.e., programs that cannot be recompiled).

The simplified microprocessor architecture 100 of FIG. 4 will now be used to illustrate the workings of a conditional direct branch. A program count register 130 is loaded with a program count value by the NEXT PC logic 120. The program count value is output onto an ADDRESS BUS which accesses memory in order to obtain an instruction. The instruction corresponding to the program count value is placed on a DATA BUS for loading into instruction register 140. The instruction is then decoded by instruction decoder 150 for input to the timing and control logic 160 for the processor. In the event that the instruction is a branch command, a branch target address will also be loaded into data/address register 128.

The timing and control logic 160 generates the timing and control signals which drive the other functional blocks of the processor. For instance, the timing and control logic 160 will select the contents of one or more registers in register file 180 for output as operands to arithmetic logic unit (ALU) 170 for processing. The timing and control logic 160 will also drive the NEXT PC logic 120 to select the next program count value to load into program count register 130.

The timing and control logic 160 generates the timing and control signals responsive to the instruction decoded by instruction decode logic 150 and the state of condition flags N, Z and C generated by ALU 170. The nonzero flag N is set by ALU 170 when it detects a nonzero value in an accumulator of the ALU. Similarly, the zero flag Z is set by ALU 170 when it detects a zero value in the accumulator. The carry flag C is active when the operation performed by the ALU 170 results in a carry-out condition.

The timing and control logic 160 integrates the conditions flags N, Z and C with the information from the instruction decode logic 150 in order to determine the state of the branch signal. For instance, a branch-on-zero-condition instruction would cause the timing and control logic 160 to generate an active branch signal if the Z flag is active. The branch signal would then cause the NEXT PC logic 120 to load the branch target address value from the data/address register 128 (which would have been loaded with the target address along with the loading of the branch command into the instruction register 140) into the program count register 130 so that execution flow proceeds to the target address. If the Z flag is not active, then the branch signal remains inactive, no branch operation is performed, and the NEXT PC logic 120 increments the program count value to obtain the next instruction in the execution sequence.

The processor architecture of FIG. 4 is one simplified example of a processor architecture. Other architectures exist which involve more complex NEXT PC functions, instruction decoding and branch conditions.

SUMMARY OF THE INVENTION

It is, therefore, an object of the invention to provide a method for collecting profile data on an executing program without instrumenting the code of the program.

Another object of the invention is to collect the profile data with minimal impact on the runtime performance of the code.

A further object of the invention is to be able to collect the profile data using hardware that is simple and inexpensive.

Another object of this invention is to allow the profile data to be dynamically associated with the running program's control flow in a straightforward manner, without requiring extensive analysis.

An embodiment of an apparatus for recording a branch history of a process, according to the present invention, includes a first trace start address register which receives an instruction address value and stores the instruction address value responsive to a first load signal. A first branch history register stores a branch history value, where the first branch history register shifts the branch history value and stores a branch outcome signal in a first position of the first branch history register responsive to a shift signal, and wherein the first branch history register clears the branch history value responsive to the first load signal. A buffer receives and stores the instruction address value of the first trace start address register and the branch history value of the first branch history register responsive to the second load signal and outputs the branch history value to the data bus responsive to a buffer selection signal. And control logic receives an instruction signal, wherein the control logic generates the shift signal responsive to a first predetermined instruction value of the instruction signal and generates the first and second load signals responsive to a second predetermined instruction value of the instruction signal.

An embodiment of a method for profiling a program executing on a computer, according to the present invention, involves storing an instruction address value in a first address register responsive to a trace termination condition, clearing a branch history value in a first branch history register responsive to the trace termination condition, and shifting a branch outcome value into the first position of the branch history register responsive to a conditional direct branch condition. The method also calls for transferring the instruction address value from the first address register to a second address register responsive to the trace termination condition, and transferring the branch history value from the first branch history register to a second branch history register responsive to the trace termination condition.

An embodiment of an apparatus for recording execution behavior in a processor, according to the present invention, includes a controller coupled to an instruction register of the processor, wherein the controller is configured to generate a first control signal responsive to a first predetermined instruction value received from the instruction register and generate a second control signal responsive to a second predetermined instruction value received from the instruction register. A first register is coupled to the controller and a program counter of the processor, wherein the first register is configured to latch a program count value received from the program counter responsive to the first control signal. A second register is coupled to the controller and the first register, wherein the second register is configured to latch the program count value of the first register responsive to the first control signal. A shift register is coupled to the controller and configured to receive a branch outcome signal of the processor, wherein the shift register is further configured to clear its content responsive to the first control signal, and wherein the shift register is also configured to shift the content of the shift register from a first position toward a second position of the shift register and shift a value of the branch outcome signal into the first position responsive to the second control signal. And a third register is coupled to the controller and the shift register and configured to latch the content of the shift register responsive to the first control signal.

The foregoing and other objects, features and advantages of the invention will become more readily apparent from the following detailed description of several embodiments of the invention which proceeds with reference to the accompanying drawings.

BRIEF DESCRIPTION OF THE DRAWINGS

FIG. 2A is a diagram of a branch target buffer used in a first conventional profiling and branch prediction method.

FIG. 2B is a diagram of history register table and pattern table used in a second conventional branch prediction method.

DETAILED DESCRIPTION OF THE PRESENT INVENTION

Figure 1:
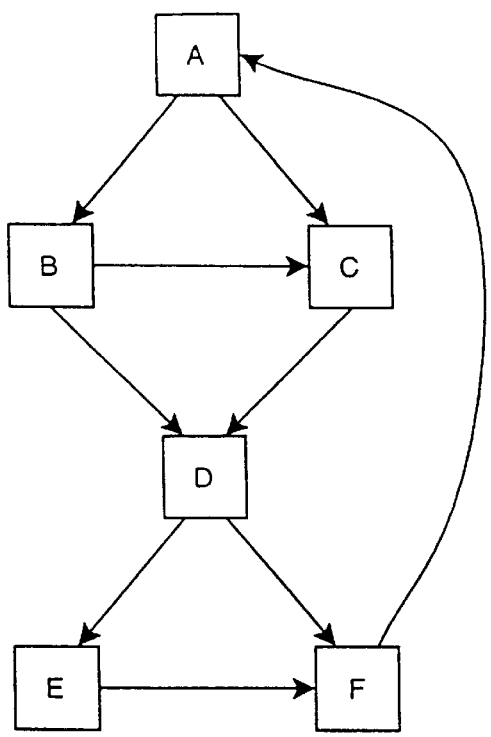
FIG. 1 illustrates a conventional control flow graph (CFG).
Figure 3:
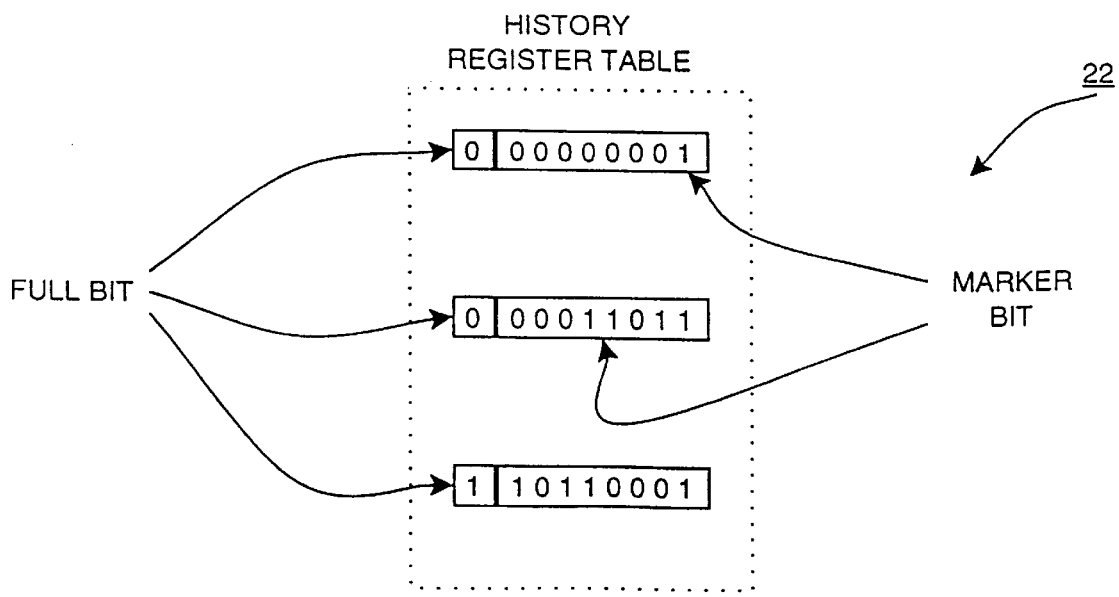
FIG. 3 is a diagram showing examples of branch histories in the history register table of FIG. 2B.
Figure 4:
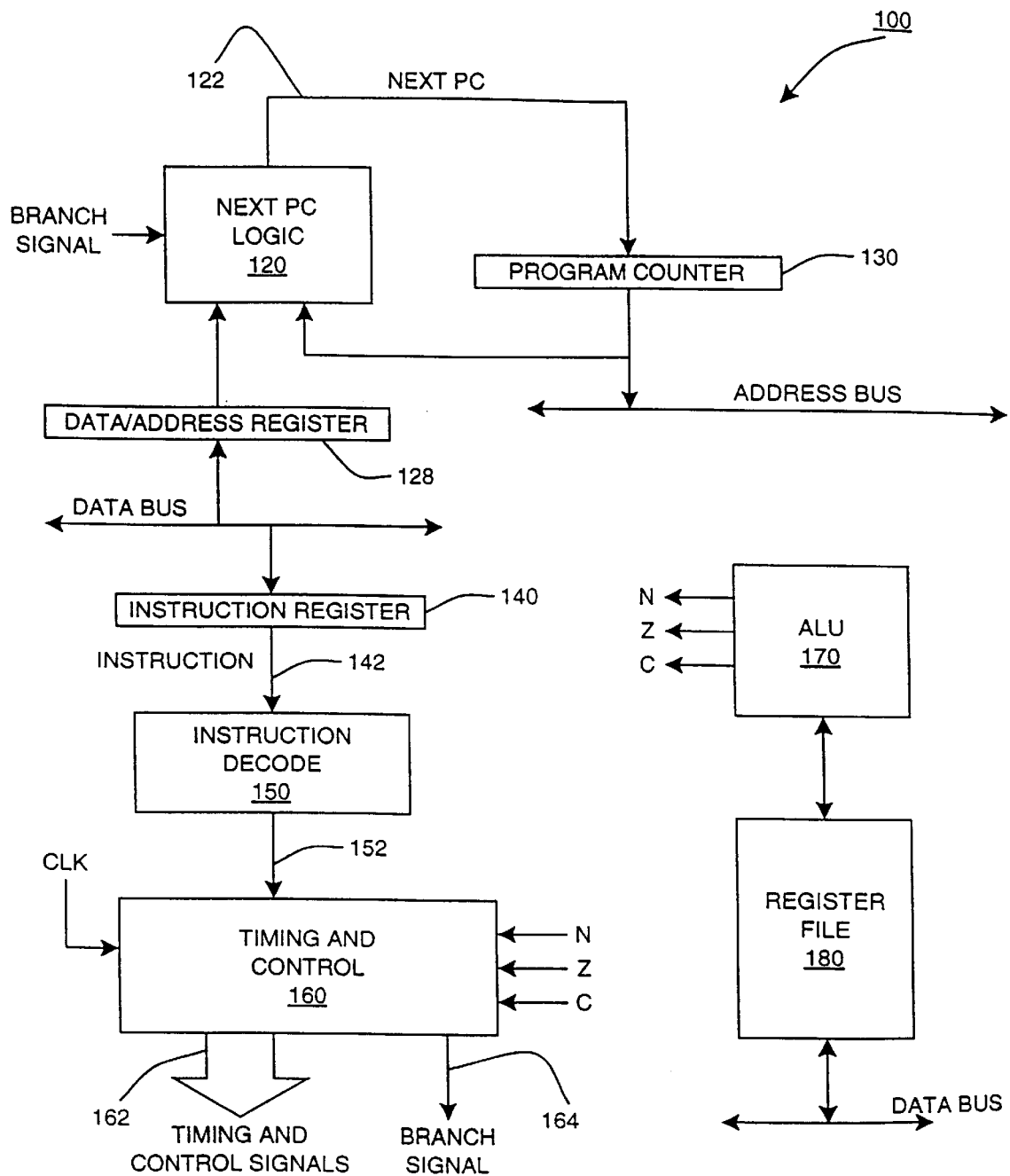
FIG. 4 is a functional block diagram of a conventional processor.

The present invention is directed towards statistical trace sampling of a program's control flow behavior as it executes on a processor, such as the processor of FIG. 4. A trace is a dynamic sequence of branches that ends when a "trace termination condition" is true. Examples of trace termination conditions are a backward taken branch, where the branch target address is a lower program count than the program count of the branch instruction, or an indirect branch, where the branch target can only be determined by executing that instance of the branch (i.e., the target cannot be determined by decoding the branch instruction itself.

It is also advantageous to limit the overhead involved with trace sampling by placing a limit on the branch history size for a trace and generating a trace termination condition when the limit is reached. The branch history limit is the maximum number of conditional direct branches allowed in a trace. The branch history limit serves to bound the size of the trace to limit overhead associated with the statistical trace sampling.

The trace termination condition is assessed at the time that a branch occurs and is based upon the behavior of the code at that point. A backward taken branch indicates the end of a trace and occurs when the target address of the branch is less than or equal to the branch instruction address. An indirect branch occurs when the target of the branch is determined by the value of some registers within the processor and is therefore dependent upon the state of the machine. One of the key characteristics of an indirect branch is that the target of the branch may be different for each execution of the same branch instruction.

In one embodiment of the present invention, a hardware assist is used to keep track of "the last executed trace", as well as a "currently executing trace" which is incomplete at the time of sampling. The operating system, or privileged software, can read the last executed trace information from the hardware assist registers. The rest of the scheme is similar to conventional statistical PC sampling. The program code is run under control of a profiler program, the profiler program makes operating system calls to set up a timer interrupt, and registers an interrupt handler procedure. When a timer interrupt occurs, the operating system invokes the handler and gives the handler the machine state and the last trace executed data at the instant of the interrupt. The handler then records this information and any other relevant hardware counters. The resulting hardware assist is inexpensive to implement and has no impact on processor cycle time.

Figure 5:
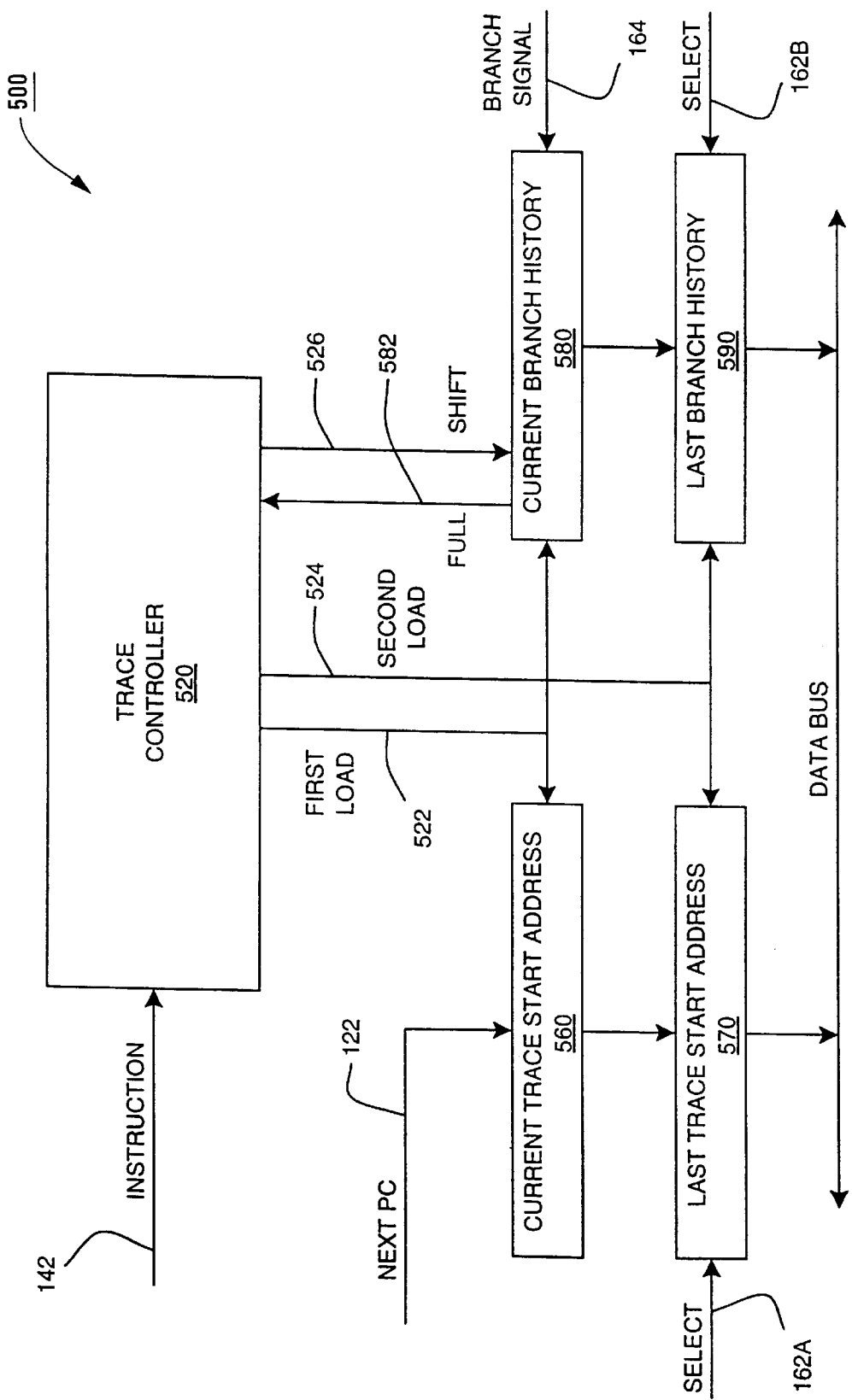
FIG. 5 is a functional block diagram of a first embodiment of trace collection logic according to the present invention.

An embodiment of trace collection logic 500, according to the present invention, is shown in FIG. 5. The trace collection logic includes a current trace start address register 560 that is coupled to the output 122 of the NEXT PC logic 120 of the processor 100 of FIG. 4. The current trace start address register 560 has a load control input whereby the register can be loaded with a NEXT PC value. The current trace start address register 560 also has an output coupled to last trace start address register 570.

The last trace start address register 570 has a load control input by which the last trace start address register 570 is loaded with the contents of the current trace start address register 560 responsive to a SECOND LOAD signal 524. The last trace start address register 570 also has a select control input which enables the contents of the last trace start address register 570 onto the DATA BUS in response to a SELECT signal 162A received from the timing and control logic 160 of FIG. 4.

A current branch history register 580 is composed of a shift register having a shift data input coupled to the branch signal 164 generated by the timing and control logic 160 of the processor 100. Coupled to an output of the current branch history register 580 is a last branch history register 590.

The current branch history register 580 also has a shift control input and a clear and set control input. The shift control input causes the contents of the register to shift towards a most significant bit position of the register and the value at the shift data input to be shifted into the least significant bit position of the register. The shift control input is driven by a SHIFT signal 526 generated by the trace controller 520. The clear and set control causes the contents of the register 580 to be cleared and the least significant bit position to be set as a marker indicating where the valid branch history begins within the contents of the register. The clear and set control receive the FIRST LOAD signal 522 from the trace controller 520.

The current branch history register 580 also outputs a FULL signal 582 which indicates that the current branch history register 580 has reached a branch history limit. In the present embodiment, the FULL signal corresponds to the bit value in the most significant bit (MSB) position of the register 580. When the marker bit is shifted into the MSB of the register, then the FULL signal will become active.

A last branch history register 590 has an input coupled to the output of the current branch history register 580 and a load control input which allows the last branch history register 590 to be loaded with the contents of the current branch history register 580 in response to the SECOND LOAD signal from the trace controller 520. The last branch history register 590 also has a select control input which receives a SELECT signal 162B from the timing and control logic 160 of FIG. 4 which enables the content of the last branch history register 590 onto the DATA BUS.

A trace controller 520 is coupled to the output 142 of instruction register 140 of processor 100. The trace controller 520 decodes the instruction stored in instruction register 140 in order to detect a trace termination condition or a conditional direct branch condition. When a trace terminating instruction, such as a backward branch or an indirect branch, is detected, then the trace controller 520 first toggles the second load signal 524 in order to transfer the content of the current trace start address register 560 to the last trace start address register 570 and to transfer the content of the current branch history register 580 to the last branch history register 590. Then, the first load signal 522 is toggled to load the NEXT PC value into the current trace start address register 560 and clear and set the branch history value in the current branch history register 580.

When conditional direct branch condition is detected by trace controller 520, then the trace controller 520 toggles the shift signal 526. The shift signal causes the branch history value in the register 580 to shift towards the MSB and load the branch signal value, which indicates the outcome of the branch instruction, into the LSB of the register.

If the shift signal 526 causes the marker bit to move into the MSB of the current branch history register 580, then the full signal 182 becomes active which also triggers a trace termination event. Therefore, the trace controller will also toggle first the second 524 and then the first 522 load signals in response to the full signal 582.

The current trace start address register 560, last trace start address register 570, current branch history register 580 and last branch history register 590 are separate dedicated registers and not part of the existing branch prediction hardware present in some conventional microprocessors. The current trace start address register 560 and current branch history register 580 become part of the profiled program's state with the addition of two corresponding fields to the context data structure. In addition, the last trace start address register 570 and last branch history register 590 become part of the processor's architecture and are independently addressable entities.

The present invention requires that the full signal 182 be detected as a trace termination event which causes the current trace start address and branch history to be copied into the last trace start address register 570 and last branch history register 590. In contrast, the scheme of Conte et al above utilizes a full bit for each entry in a branch history register table that is set when the branch history entry becomes full and remains set until reset. The branch history buffer in conventional branch prediction logic typically includes several hundred branch history entries. Even after the full-bit is set, the branch history of Conte et al continues to be shifted resulting in a loss of the most significant bits of the branch history entry. Thus, the present invention allows the execution path to be completely reconstructed because the complete branch history is preserved.

Figure 6:
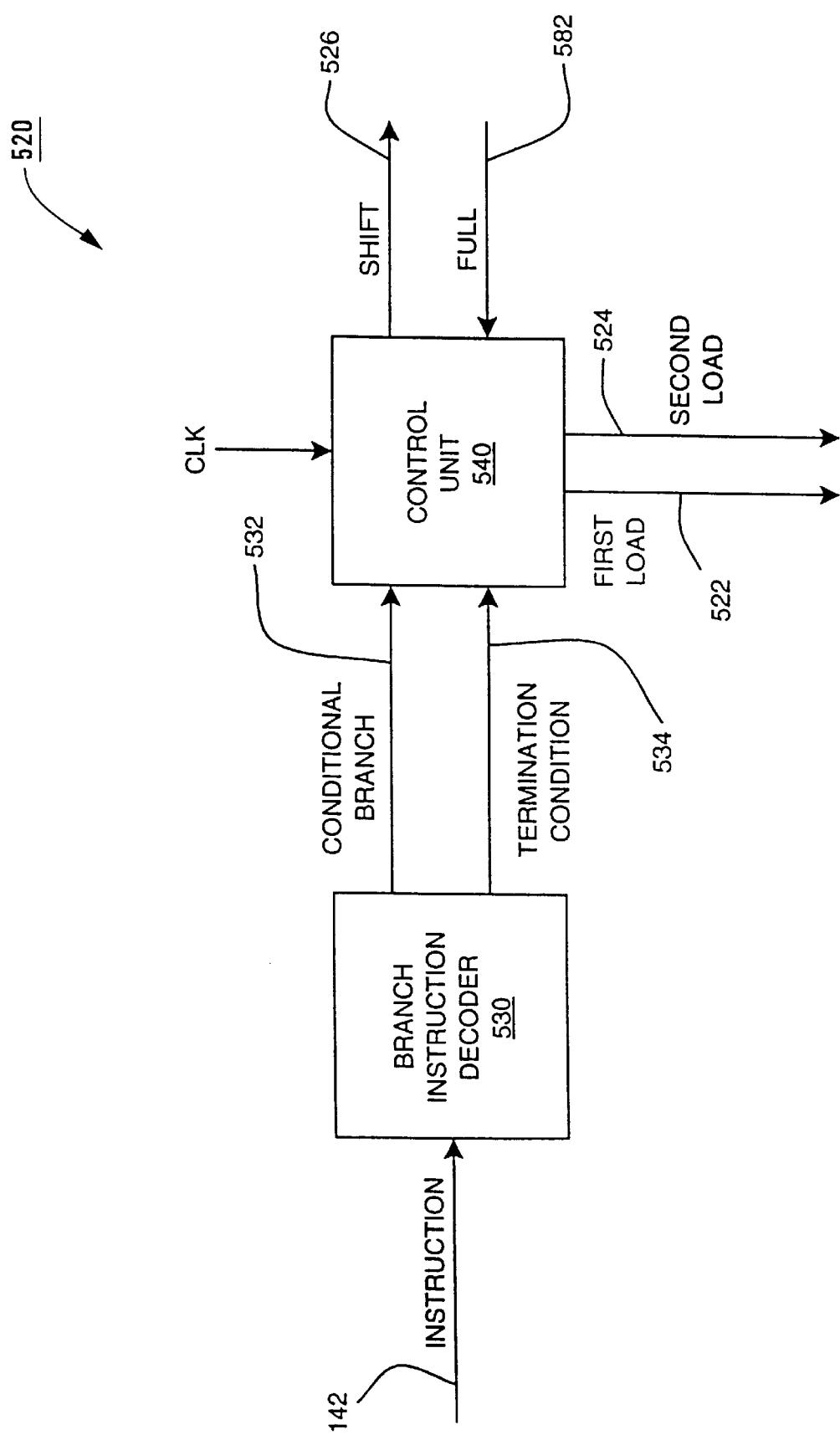
FIG. 6 is a functional block diagram of one embodiment of the trace controller of FIG. 5.

Referring now to FIG. 6, one embodiment of the trace controller 520 of FIG. 5 is shown. A branch instruction decoder 530 is coupled to the output 142 of the instruction register 140 of FIG. 4. The branch instruction decoder 530 generates a conditional direct branch signal 532 in response to any one of a set of conditional direct branch commands. A termination condition signal 534 is generated by the branch instruction decoder 530 in response to any one of a set of trace terminating commands.

A control unit 540 generates the shift signal 526 in response to the conditional direct branch signal 532. The control unit 540 also generates the first and second load signals 522 and 524 in response to either the termination condition signal 534 or the full signal 582. The second load signal 524 is toggled before the first load signal 522 is toggled. Note that the control unit 540 also receives the processor clock signal CLK in order to synchronize the generation of the first and second load signals and the shift signal with the generation of the timing and control signals generated by the timing and control logic 160 of processor 100 shown in FIG. 4.

Note that if the appropriate information is available from the instruction decoder 154 of processor 100, then the output of instruction decoder 150 may be used to detect the trace termination and conditional direct branch conditions and the instruction decode function of trace controller 520, performed by branch instruction decoder 530, may be eliminated. Further note that the first and second load signals 522 and 524 can be reduced to a single signal if the current trace start address register 560 and current branch history register 580 are suitably constructed such that they retain their contents at their outputs long enough for the last trace start address register 570 and last branch history register 590, respectively, to latch the output signal responsive to the same load signal. These and other modifications to the embodiment shown would be understood by one of skill in the art and do not depart from the spirit of the present invention.

The statistical trace sampling method of the present invention encodes a code trace as a start address and branch history pair. The start address is the program count or instruction address where the trace starts. The trace start address for the next trace is obtained when a trace termination event occurs for the current trace causing the trace controller 520 of FIG. 5 to toggle the first load signal 522 which loads the NEXT PC value at the output 122 of the NEXT PC logic 120 of processor 100, shown in FIG. 4, into the current trace start address 560. This causes the same program count value to be loaded into the current trace start address 560 as is loaded into the program counter 130.

Figure 7:
FIG. 7 is a diagram illustrating an example of the function of the trace collection logic of FIG. 5.

At the same time, the first load signal 524 also clears the current branch history register 580 and sets a marker bit in the LSB of register 580. This situation is illustrated in FIG. 7 where the code address "AAA" is loaded into the current trace start address register 580 and is consequently shown as an entry in the table. (Of course, the label "AAA" is used for the purposes of explanation here and the actual address value is a binary number.) The current branch history value is in its initialized state, which is "0000000" in the example but which may be any number of bits. The "1" value in the LSB position of the current branch history register 580 represents a market bit to indicate when the valid branch history bits begin. In other words, bits to the right of the leading zero in the branch history value represent valid branch history.

The last trace start address value "XXX" and branch history value "0010010", which had been resident in the current trace start address register 560 and current branch history register 580, respectively, are transferred into the last trace start address register 570 and last branch history register 590, respectively.

The code segment of the trace executes until the conditional direct branch instruction "BRANCH TO BBB IF Z IS TRUE" is encountered. This conditional direct branch instruction is decoded by trace controller 520 which toggles the SHIFT signal 526. In the example, the Z flag of processor 100 is true and the branch is taken. Therefore, the BRANCH SIGNAL 164 is true and a logical "1" is loaded into the LSB of the current branch history register 580 responsive to the SHIFT signal. The branch history value thus becomes "0000001".

Control flow then branches to address "BBB" where sequential execution resumes until another conditional direct branch instruction "BRANCH TO CCC IF N IS TRUE" is encountered. However, the N flag is not true, in the example, and the branch is not taken. Therefore, the BRANCH SIGNAL 164 will be false and a logical "0" is shifted into the LSB of the current branch history register 580 when the trace controller 520 toggles the SHIFT signal 526 responsive to the conditional direct branch instruction. The branch history value thus becomes "00000110".

Control flow continues sequentially until the conditional direct branch instruction "BRANCH TO DDD IF C IS TRUE" is encountered, where the C flag is true and the branch is taken. The branch history value thus becomes "0000110" and control flow continues at the instruction at address "DDD".

The instruction "BRANCH TO WWW" represents an indirect branch resulting in a trace termination condition which is detected by the trace controller 520. Trace controller 520 first toggles the second load signal 524 which loads the address value "AAA" resident in current trace start address 560 into the last trace start address 570. At the same time, the branch history value "0000110" resident in current branch history register 580 is loaded into last branch history register 590.

Trace controller 520 then toggles the first load signal 522 which loads the NEXT PC value "WWW", the target address of the indirect branch instruction, into the current trace start address register 560 and initializes the current branch history register 580 to "0000000" in preparation for obtaining the next code trace.

At this point, the content of the last trace start address register 570 and the last branch history register 590 are available to software. Each of these registers is visible to the processor architecture and can be addressed to obtain their contents. Thus, an instruction for access to the last trace start address register 570 will cause the SELECT signal 162A to be asserted by the timing and control logic 160 of processor 100 and the contents "AAA" of the register will be output onto the processor DATA BUS. Similarly, an instruction accessing the last branch history register 590 results in the SELECT signal 162B being asserted and the branch history value "0000110" being output onto the processor DATA BUS.

As can be seen from the discussion above, the branch history is a bit string wherein each bit denotes the outcome of a conditional direct branch in the trace and represents whether the branch was taken or not taken. The branch history ends when a trace terminating condition is reached. However, if a leading bit reaches the left-most position, i.e. the marker bit reaches the MSB position in the current branch history register 580 of the embodiment shown, then it indicates that the branch history limit has been reached causing the FULL signal 582 to be asserted and a trace termination occurs.

In order to collect profiling information, profiling must be enabled in the operating system that is running the code to be profiled. Once profiling is enabled, there are a number of approaches which can be taken with regard to the collection of data. First, branch history data on each trace can be obtained by generating an interrupt each time a trace ends, i.e. generate an interrupt in response to each trace termination condition. The branch history data for the trace that has just completed is recorded at each interrupt and the resulting profile is highly accurate and complete. However, there can be frequent interruptions due to trace terminations which can result in high levels of overhead to handle each of the interruptions.

Alternatively, if reducing the overhead of profiling is of greater concern than the accuracy of the profile data, then intermittent trace profiling can be used to significantly lower overhead. This can be done completely by software in a manner similar to statistical PC sampling. The OS delivers a timer interrupt at a certain frequency, and when the interrupt arrives, a handler routine is used to read the trace data from the context of the profiled program that is handling to the handler routine by the OS. Alternatively, instead of having the OS deliver a timer interrupt, hardware assist in the form of sampling frequency counter can be used that is initialized to a count value before the profiled program starts execution. The sampling frequency counter is then decremented at each trace termination event. For instance, the FIRST LOAD signal 522 generated by trace controller 520 of FIG. 5 could be used to decrement the sampling counter. When the counter reaches zero, an interrupt is generated and the trace data is recorded. The sampling frequency can be adjusted after recording the trace data at an interrupt by lowering the value of the count loaded into the counter at initialization.

Figure 8:
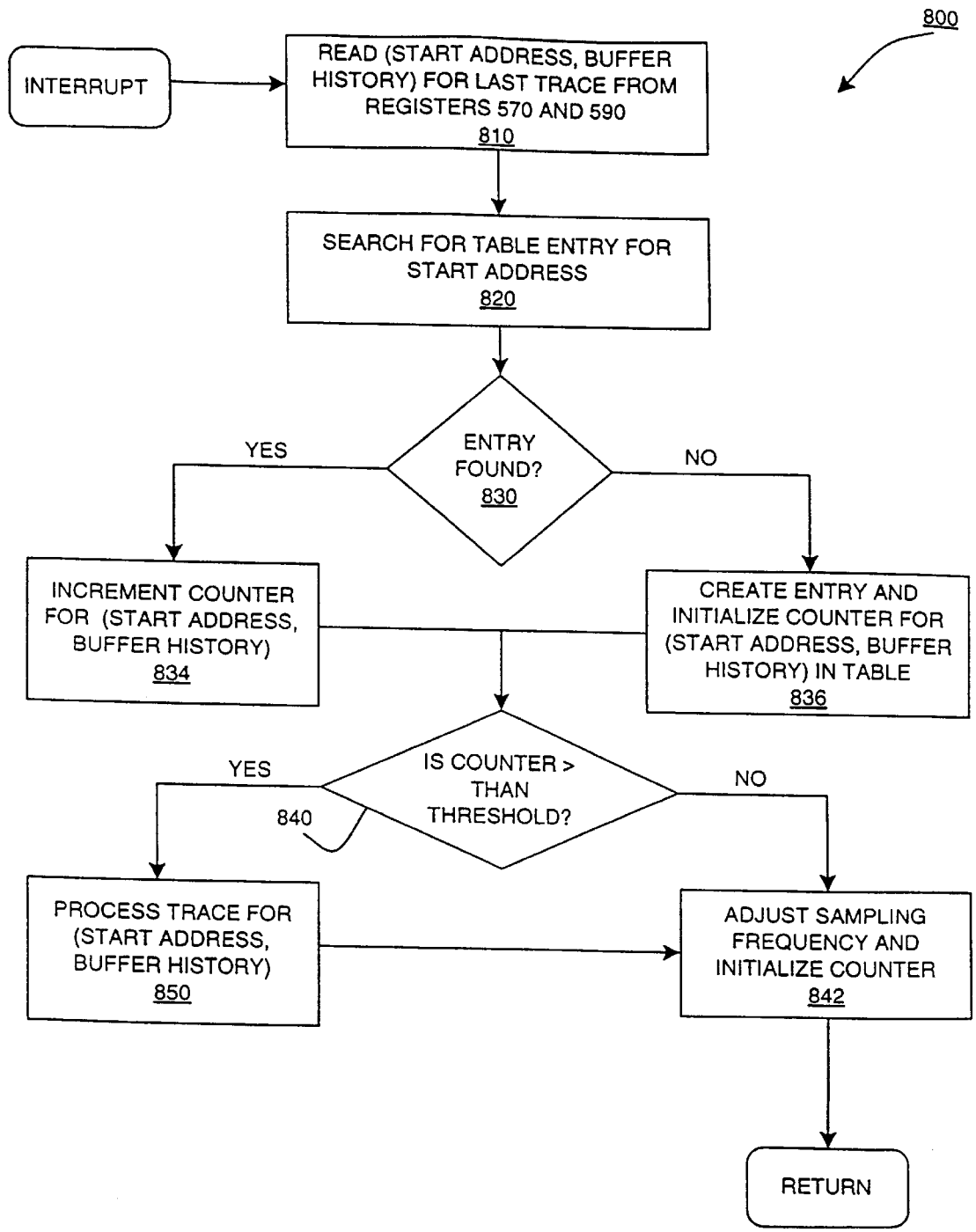
FIG. 8 is a control flow diagram of an embodiment of an interrupt handling routine for the present invention.

An embodiment of the flow control for an interrupt handling routine 800 is shown in FIG. 8. In response to an interrupt generated as described above, the software interrupt handler, at step 810, reads the START ADDRESS and BRANCH HISTORY value from the last trace start address register 570 and last branch history register 590, respectively, shown in FIG. 5. A table is then searched for an entry corresponding to the START ADDRESS value, at step 820. One approach is to construct a hash table and hash the START ADDRESS in order to find the corresponding entry for the START ADDRESS and BRANCH HISTORY.

If no table entry is found, then control branch, at step 830, to step 836 where a table entry is created for the START ADDRESS and BRANCH HISTORY and trace data, typically a counter, is initialized. If an entry is found, then, at step 834, the trace data in the table is updated, i.e. the counter is incremented.

At this point, if only statistical profiling for the executing code is desired, then control may return to the executing code and the data in the hash table can be processed post run-time. However, one of the advantages of the present invention is that the profile data may be used directly during execution to optimize the executing code. This feature can be particularly valuable in dynamically optimizing or translating the executing code while it is running. For example, the present invention may be used in connection with the invention described in commonly assigned, co-pending patent application Ser. No. 09/186,945 filed Nov. 5, 1998 entitled "METHOD FOR SELECTING ACTIVE CODE TRACES FOR TRANSLATION IN A CACHING DYNAMIC TRANSLATOR" herein incorporated by reference for all purposes.

To accommodate run-time processing of the profile data, the trace data for the table entry is checked at step 840 to see if it has reached a threshold. If the data, or counter value, has exceeded this predetermined threshold, then the trace data is processed at step 850 before returning to execution of the code. Otherwise, if intermittent profiling is used, then it may be appropriate to adjust the sampling frequency at step 842. As discussed above, the sampling frequency can be adjusted by simply lowering the value to which the sampling frequency counter is initialized. One approach is to increase the sampling frequency once one of the code traces has exceeded an activity threshold. This would allow execution of the code to proceed with minimal sampling overhead until a certain level of activity has been observed that justifies a higher level of sampling.

When a process context switch interrupt occurs, than all four buffer registers, the current trace start address register 560, last trace start address register 570, current branch history register 580 and last branch history register 590, are saved by the operating system during a process context switch. Alternatively, only the current trace registers 560 and 580 are saved and, when the process context is restored, the last trace registers 570 and 590 are zeroed out. Note that this extra data needs to be saved during a context switch only if the process has requested trace profiling from the operating system. Thus, processes that are not being profiled do not incur the extra overhead when their contexts are saved or restored.

As mentioned above, one of the advantages of the present invention is that the profile data can be processed during run-time. Run-time processing is particularly useful for dynamic translation, binary translation, just-in-time compilation and runtime translation. Using the present invention, traces can be disassembled by walking through binary images of the program code. By taking the branch history value for a trace, the flow control of the trace can be disassembled by starting at the start address, and associating the bit value of the branch history with each conditional direct branch within the trace. This disassembly can be performed at runtime without any additional information to be pre-computed prior to runtime.

Even if a trace proceeds through multiple dynamically linked procedures, disassembly is still possible because the dynamic target addresses are present in the binary image of the code. On the other hand, post run-time disassembly of dynamic links will be difficult or impossible because the dynamic address data may be lost once the process terminates and the linkages will likely be entirely different when the code is next executed.

Figure 9:
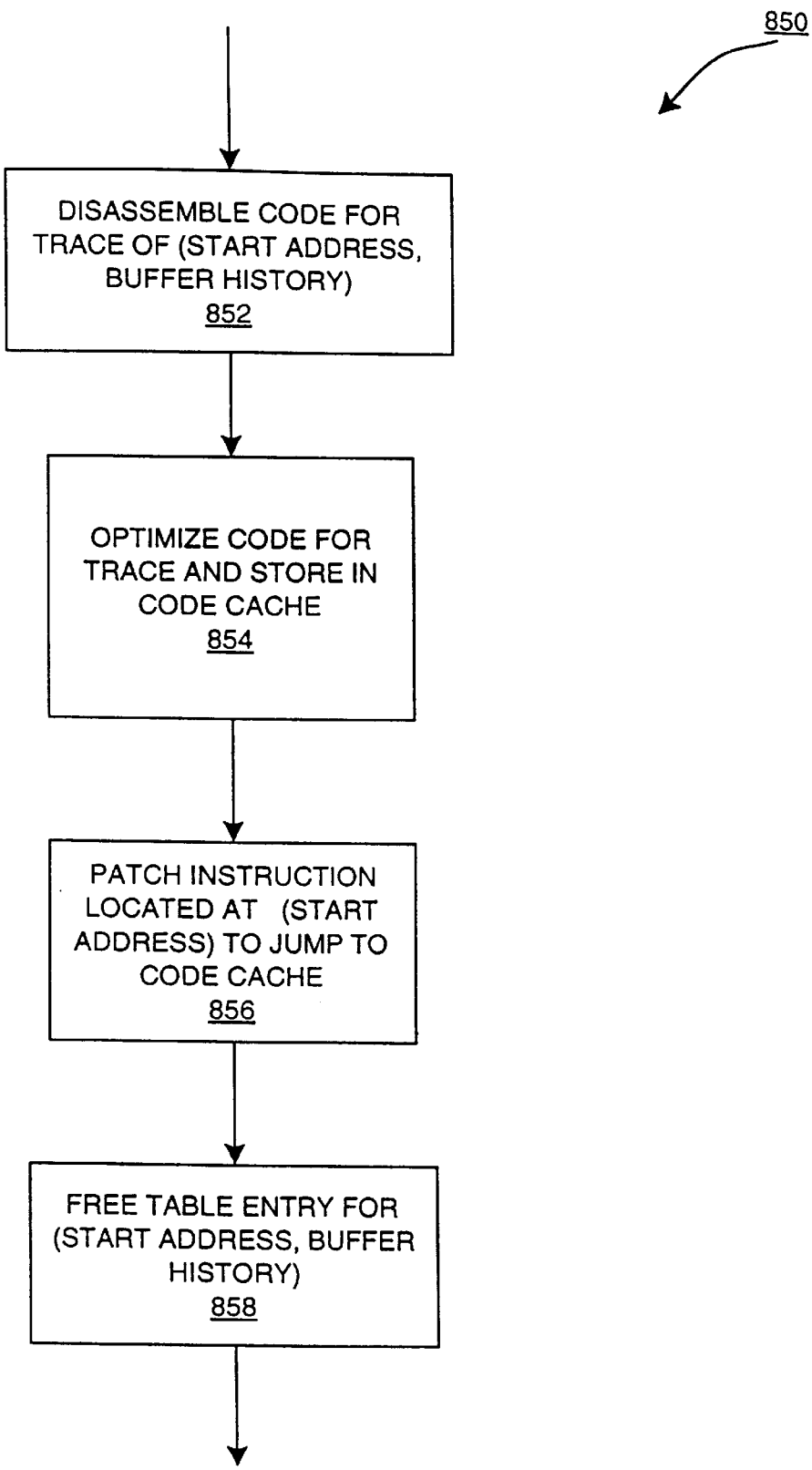
FIG. 9 is a control flow diagram showing greater detail of the step 850 for processing a code trace of FIG. 8.

An embodiment of the step 850 of FIG. 8, wherein the profile data of a trace is dynamically processed, is shown in greater detail in FIG. 9. To process the trace data, the trace is first disassembled, at step 852, from the binary image of the trace code starting at the START ADDRESS. Each instruction binary image is disassembled until a conditional direct branch is encountered. The BRANCH HISTORY value is used starting with the most significant bit adjacent the marker bit of the valid portion of the BRANCH HISTORY value. Disassembly then either proceeds in sequence, if the branch history bit indicates the branch was not taken, or continues at the target address of the branch, if a branch is indicated. This process continues until the instruction corresponding to the trace termination condition is encountered.

The code is then optimized, at step 854, and stored in a code cache for future execution. Any relevant code optimization technique could be used at this point.

The executing code is then patched, at step 856, by replacing the instruction at the START ADDRESS for the trace with a jump to the start of the code in the code cache corresponding to the code trace. The code for the code trace having been processed and replaced, the table entry for the START ADDRESS and BRANCH HISTORY can be released at step 858.

The present invention can be used in connection with both "virtual machines" and hardware machines (in this context, "machine" being a term roughly comparable to "processor"). A virtual machine is like a hardware machine, but the virtual machine is implemented in software. The virtual machine software runs on a hardware machine (possibly through another virtual machine) that, in general, is of a different architecture from that of the virtual machine. For example, Sun Microsystems has defined a virtual machine that is related to the Java programming language; this virtual machine executes what are known as Java bytecodes. Like a hardware machine, a virtual machine is largely defined by the set of instruction codes that it executes—its instruction set (the bytecodes in the example in the preceding sentence). By creating virtual machine implementations for each of several hardware machines (each virtual machine implementing the same machine architecture, but doing so while running on a different hardware machine), it is then possible to distribute a single binary version of programs (a version of the program that runs on the virtual machine) that can be used on any of the different hardware machines (will run on such diverse hardware machines when those hardware machines are combined with a the appropriate versions of the virtual machine software).

The "registers" and "logic" described above can be implemented in hardware or software. Even in a "software" implementation, there is underlying hardware that stores data and performs logical operations. However, in such an implementation there will not be a distinctive hardware storage location that is designed specifically for one of these registers. Rather, the software will give the distinctive meaning to data that is stored in general purpose storage locations in the underlying hardware. Similarly, "control logic" that might, in one implementation, be implemented as dedicate circuits, can also be implemented by special purpose software running on a general purpose hardware. That underlying hardware provides the fundamental logical control, but of a general nature. The software "directs" the general purpose hardware to perform the specific logical operations.

Figure 10:
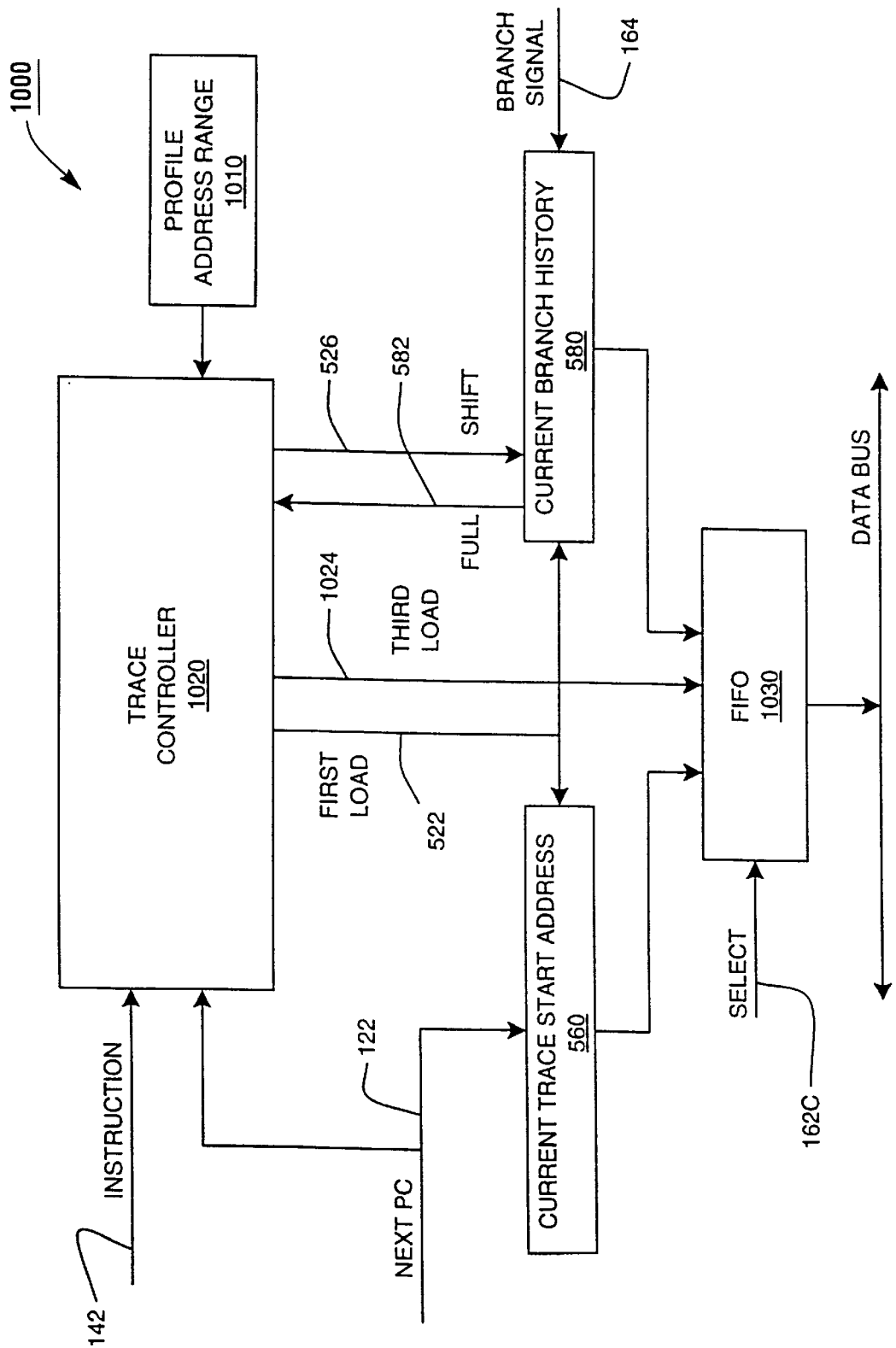
FIG. 10 is a functional block diagram of a second embodiment of trace collection logic according to the present invention.

There are many further possible variations of the configuration of the present invention. For instance, FIG. 10 illustrates another embodiment of a trace collection logic 1000 according to the present invention. One variation of the trace collection logic 1000 from the previous embodiment 500 of FIG. 5 is the inclusion of a profile address range buffer 1010. In order to limit trace profiling to a section of code for which profiling is desirable, the profile address range buffer 1010 can be loaded by privileged software, i.e. the operating system, with virtual address bounds for the code to be profiled. Trace controller 1020 is then modified to only collect trace data for code traces having start addresses within the virtual bounds stored in the profile address range buffer 1010.

Another possible variation is replacing the last trace start address register 570 and last branch history register 590 with FIFO 1030. FIFO 1030 is coupled to the output of current trace start address register 560 and current branch history register 580 and can store the START ADDRESS and BRANCH HISTORY pair for a number of code traces.

Trace controller 1020 generates a THIRD LOAD signal 1028 in response to a trace termination condition. The THIRD LOAD signal 1028 is input to first-in-first-out (FIFO) buffer 1030 and loads the contents of the current trace start address register 560 and current branch history register 580 into the FIFO 1030. The interrupt handling routine selects FIFO 1030 using the SELECT signal 162C to read the contents of the FIFO. Since FIFO 1030 can collect the START ADDRESS and BRANCH HISTORY values for a number of code traces, each interrupt cycle is able to process the trace data for a number of code traces. FIFO 1030 can also be constructed to generate a FIFO full signal which generates an interrupt signal or the sampling frequency can be adjusted based upon the number of entries in FIFO 1030. The overhead of statistical profiling can therefore be reduced still further. While a FIFO buffer is illustrated in this embodiment, any buffer, such as a last-in-first-out (LIFO), which will store multiple entries will also work in the present invention.

An advantage of the present invention is that statistical profiling of a program can be performed without instrumenting the program code. In addition, the profiling data can be obtained with minimal impact on cycle time. There are several reasons why cycle time is relatively unaffected. First, when a conditional direct branch executes, the profiling system only needs to shift the branch outcome into the current trace branch history buffer as a side effect. In other words, the current trace information is collected out of the critical execution path, rather than inside of it, as instrumented code does. Consequently, there is no impact on the critical execution path from the conditional direct branch instruction and there is no cycle time impact.

Also, the present invention can be applied to legacy program binary code. Often legacy programs cannot be recompiled which prevents instrumentation code from being added and also prevents the use of post-runtime analysis and recompilation. Because the present invention can be employed without recompilation, it can be applied to legacy program binary code.

Furthermore, no additional information must be supplied with the program code and no profile data need be output from the system. Instead, software can sample the buffered branch history and start address at regular intervals in order to reconstruct the control flow.

Another advantage to the present invention is that it is inexpensive because the hardware can be implemented using simple logic components. The hardware required is merely a shifter and a few comparators as well as four registers to hold the start address and branch history values. Also, many modern processors already have logic which can be used to control the address and branch history buffers of the present invention, thereby reducing the cost and complexity still further.

Most modern processors now use even more logic than in the present invention in order to perform dynamic branch prediction.

Still another advantage to the present invention is that no modifications to the operating system are required. In the present invention, the current start address and current branch history become part of the profiled program's state. Therefore, only the context data structure needs to be enhanced to accommodate two additional register fields for storage of the current trace start address and current branch history.

Yet another advantage to the present invention is that it allows the execution time of program code to be reduced while the program is running. Program execution can be improved through runtime generation of optimized code for traces, based upon the runtime characteristics of the code, which are transferred into a code cache maintained separately from the program code.

Having described and illustrated the principles of the invention in a preferred embodiment thereof, it should be apparent that the invention can be modified in arrangement and detail without departing from such principles. I claim all modifications and variations coming within the spirit and scope of the following claims.

What is claimed is:

1. An apparatus for recording a branch history of a process, the apparatus comprising:

a first trace start address register which receives an instruction address value and stores the instruction address value responsive to a first load signal;

a first branch history register which stores a branch history value, where the first branch history register shifts the branch history value and stores a branch outcome signal in a first position of the first branch history register responsive to a shift signal, and wherein the first branch history register clears the branch history value responsive to the first load signal;

a buffer which receives and stores the instruction address value of the first trace start address register and the branch history value of the first branch history register responsive to a second load signal and outputs the branch history value to a data bus responsive to a buffer selection signal; and a controller which receives instruction signals, wherein the controller generates the shift signal and the first and second load signals responsive to such instruction signals, including generating the shift signal when at least certain conditional branch instructions are detected and generating the second load signal when a trace termination condition is detected.

2. The apparatus of claim 1, wherein the buffer further comprises:

a second trace start address register which receives and stores the instruction address value of the first trace start address register responsive to a second load signal and outputs the instruction address value to a data bus responsive to a first selection signal; and a second branch history register which receives and stores the branch history value of the first branch history register responsive to the second load signal and outputs the branch history value to the data bus responsive to a second selection signal.

3. The apparatus of claim 1, wherein the buffer is a FIFO buffer configured to store a plurality of instruction address values and branch history values and output one of the plurality of instruction address values and branch history values responsive to the buffer selection signal.

4. The apparatus of claim 1, wherein the controller generates the second load signal before generating the first load signal.

5. The apparatus of claim 1, wherein:

the first branch history register also sets a marker in the first position responsive to the first load signal and further wherein the first branch history register generates a full signal responsive to the marker shifting into a second position of the first branch history register; and the controller generates the first and second load signals responsive to either the trace termination signal or the full signal.

6. The apparatus of claim 1, further including an address range buffer configured to store first and second address values, where the controller is further configured to receive the instruction address value and the first and second address values and the controller compares the instruction address value to the first and second address values and suppresses the first control signal when the instruction address value is outside an address range defined by the first and second address values.

7. A method for profiling a program executing on a computer, the method comprising the steps:

storing an instruction address value in a first address register;

shifting a branch outcome value into the first position of a first branch history register responsive to a conditional direct branch condition;

transferring the instruction address value from the first address register to a second address register responsive to a trace termination condition; and transferring a branch history value from the first branch history register to a second branch history register responsive to the trace termination condition.

8. The method of claim 7, wherein the second address register and the second branch history register both reside in a multiple entry buffer.

9. The method of claim 7, wherein the trace termination condition occurs responsive to a backward branch instruction value and occurs responsive to an indirect branch instruction value.

10. The method of claim 9, wherein the conditional direct branch condition occurs responsive to a conditional direct branch instruction having only two possible branch outcomes.

11. The method of claim 7, wherein the storing of an instruction address value in the first address register is responsive to the trace termination condition, and further comprising the step of clearing a branch history value in a first branch history register responsive to the trace termination condition.

12. The method of claim 7, including the steps:

interrupting execution of the program;

reading the instruction address value from the second address register;

reading the branch history value from the second branch history register; and transferring the instruction address value and branch history value to an entry in a table.

13. The method of claim 12, wherein the step of interrupting execution of the program includes:

interrupting execution of the program responsive to the trace termination condition.

14. The method of claim 12, wherein the step of interrupting execution of the program includes:

interrupting execution of the program at a sampling frequency time interval.

15. The method of claim 12, wherein the step of transferring the instruction address value and branch history value to an entry in a table further includes:

searching the table for an entry corresponding to the instruction address value and branch history value;

updating profile data for the entry corresponding to the instruction address and branch history value if the corresponding entry is found; and creating the corresponding entry in the table for the instruction address value and branch history value if the corresponding entry is not found.

16. The method of claim 15, including the steps:

interrupting execution of the program at a sampling frequency time interval; and varying the sampling frequency time interval responsive to the profile data.

17. The method of claim 12, wherein the step of interrupting execution of the program includes:

counting each occurrence of the trace termination condition to obtain a count; and interrupting execution of the program responsive to a predetermined value of the count.

18. The method of claim 7, including the steps:

setting a marker in a first position of the branch history register responsive to an occurrence of the trace termination condition; and generating an occurrence of the trace termination condition responsive to the marker shifting into a second position of the branch history register.

19. The method of claim 18, including the steps:

interrupting program execution;

reading the instruction address value from the second address register and storing the instruction address value in a table entry; and reading the branch history value from the second branch history register and storing the branch history value in the table entry.

20. The method of claim 19, including the steps:

retrieving the branch history value for an executed trace from the table entry corresponding to a start address of the executed trace;

obtaining a set of executed instructions for the executed trace by disassembling the executed trace using the branch history value for the executed trace;

storing the set of executed instructions in a code cache; and patching the instruction located at the start address of the executed trace to jump to the set of executed instructions in the code cache.

21. The method of claim 20, wherein the step of obtaining a set of executed instructions for the executed trace by disassembling the executed trace using the branch history value for the executed trace further includes:

disassembling each instruction of the executed trace sequentially until a conditional direct branch instruction is encountered;

shifting the branch history value to obtain the branch outcome value corresponding to the conditional direct branch instruction encountered;

sequentially disassembling the executed trace until another conditional direct branch instruction is encountered if the branch outcome value corresponding to the conditional direct branch instruction is set to a first logical state; and continuing disassembly of the executed trace from a target address of the conditional direct branch instruction until yet another conditional direct branch instruction is encountered if the branch outcome value corresponding to the conditional direct branch instruction is set to a second logical state.

22. The method of claim 7, further including the step of suppressing the trace termination condition when the instruction address value is outside of an address range.

23. The method of claim 22, further including the address range is defined by a software program.

24. A method for profiling a program executing on a computer, the method comprising the steps:

storing an instruction address value in a first address register;

shifting a branch outcome value into the first position of a first branch history register responsive to a conditional direct branch condition;

transferring the instruction address value from the first address register to a second address register responsive to a trace termination condition;

transferring a branch history value from the first branch history register to a second branch history register responsive to the trace termination condition;

reading the instruction address value from the second address register;

reading the branch history value from the second branch history register;

retrieving a previously stored branch history value for an executed trace;

obtaining a set of executed instructions for the executed trace by disassembling the executed trace using the branch history value for the executed trace;

storing the set of executed instructions in a code cache; and patching the instruction located at the start address of the executed trace to jump to the set of executed instructions in the code cache.

25. The method of claim 24, including the step of optimizing the set of executed instructions for the executed trace.

26. The method of claim 24, wherein the step of obtaining a set of executed instructions for the executed trace by disassembling the executed trace using the branch history value for the executed trace includes:

disassembling each instruction from the start address of the executed trace to a first conditional direct branch instruction of the executed trace;

continuing disassembly from a next sequential instruction following the first conditional direct branch instruction to a next conditional direct branch instruction if a first value of the branch history that is adjacent the marker is set to a first logical state; and continuing disassembly at a target address of the first conditional direct branch instruction to the next conditional direct branch instruction if the first value of the branch history that is adjacent the marker is set to a second logical state.

27. An apparatus for recording execution behavior in a processor, the apparatus comprising:

a controller coupled to an instruction register of the processor, wherein the controller is configured to generate a first control signal responsive to a first predetermined instruction value received from the instruction register and generate a second control signal responsive to a second predetermined instruction value received from the instruction register;

a first register coupled to the controller and a program count register of the processor, wherein the first register is configured to latch a program count value received from the program count register responsive to the first control signal;

a second register coupled to the controller and the first register, wherein the second register is configured to latch the program count value of the first register responsive to the first control signal;

a shift register coupled to the controller and configured to receive a branch outcome signal of the processor, wherein the shift register is further configured to clear its content responsive to the first control signal, and wherein the shift register is also configured to shift the content of the shift register from a first position toward a second position of the shift register and shift a value of the branch outcome signal into the first position responsive to the second control signal; and a third register coupled to the controller and the shift register and configured to latch the content of the shift register responsive to the first control signal.

28. The apparatus of claim 27, wherein the second and third registers are both part of a multiple entry device, wherein the multiple entry device is configured to store multiple entries of the contents of the second and third registers, and wherein the multiple entry device is configured to latch the contents of each of the second and third registers in one of the multiple entries responsive to each time the first control signal is activated.

29. The apparatus of claim 28, wherein the multiple entry device is further configured to output one of the multiple entries responsive to a selection signal.

30. The apparatus of claim 29, wherein the multiple entry device is a FIFO.

31. The apparatus of claim 27, wherein:

the second register is configured to output its contents responsive to a first selection signal; and the third register is configured to output its contents responsive to a second selection signal.

32. The apparatus of claim 27, wherein:

the shift register is further configured to set a marker bit in the first position of the shift register responsive to the first control signal and generate a full signal when the marker bit is shifted into the second position of the shift register; and the controller is further configured to generate the first control signal responsive to the full signal received from the shift register.

33. The apparatus of claim 27, further including a profile address range buffer configured to store first and second address values which define an address range, wherein the controller is further coupled to the program count register and the profile address range buffer, and where the controller is further configured to compare the program count value received from the program count register to the address range defined by the first and second address values of the profile address range buffer and inhibit the first control signal when the program count value is outside the address range.

* * * * *

UNITED STATES PATENT AND TRADEMARK OFFICE
CERTIFICATE OF CORRECTION

PATENT NO.    : 6,233,678 B1
DATED         : May 15, 2001
INVENTOR(S)   : Vasanth Bala It is certified that error appears in the above-identified patent and that said Letters Patent is hereby corrected as shown below:

<u>Column 4,</u>
Line 54, delete "Over counting" and insert therefor -- Overcounting --

<u>Column 8,</u>
Line 13, after "itself" insert -- ) --

<u>Column 10,</u>
Line 48, delete "decoder 154" and insert therefor -- decoder 150 --

<u>Column 11,</u>
Line 16, after "number.)" begin a new paragraph
Line 39, delete "0000001" and insert therefor -- 00000011 --
Line 55, delete "0000110" and insert therefor -- 00001101 --
Line 63, delete "0000110" and insert therefor -- 00001101 --

<u>Column 12,</u>
Line 3, delete "0000000" and insert therefor -- 00000001 --
Line 16, delete "0000110" and insert therefor -- 00001101 --

<u>Column 16,</u>
Line 19, after "further." do not begin new paragraph

Signed and Sealed this

Twenty-sixth Day of November, 2002

*Attest:*

*Attesting Officer*

JAMES E. ROGAN
*Director of the United States Patent and Trademark Office*